(12) United States Patent
Duraffourg et al.

(10) Patent No.: US 10,845,242 B2
(45) Date of Patent: Nov. 24, 2020

(54) MEASURING DEVICE BASED ON AN OPTICAL MEASUREMENT IN AN OPTO-MECHANICAL CAVITY

(71) Applicant: Commissariat A L'Energie Atomique et aux Energies Alternatives, Paris (FR)

(72) Inventors: Laurent Duraffourg, Grenoble (FR); Jean-Marc Fedeli, Grenoble (FR); Serge Gidon, Grenoble (FR); Pierre Labeye, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/674,080

(22) Filed: Nov. 5, 2019

(65) Prior Publication Data
US 2020/0141805 A1    May 7, 2020

(30) Foreign Application Priority Data
Nov. 6, 2018 (FR) .................................... 18 60198

(51) Int. Cl.
*G01J 3/00*  (2006.01)
*G01J 3/42*  (2006.01)
(Continued)

(52) U.S. Cl.
CPC ............ *G01J 3/42* (2013.01); *G01N 21/3504* (2013.01); *G01N 21/39* (2013.01)

(58) Field of Classification Search
CPC ....... G01J 3/42; G01N 21/3504; G01N 21/39; G01N 21/1702; G01N 2021/1704; G01N 21/17; G02B 26/007; G02B 26/266
See application file for complete search history.

(56) References Cited

U.S. PATENT DOCUMENTS

| | | | |
|---|---|---|---|
| 5,195,374 A | 3/1993 | Parsons et al. | |
| 6,324,910 B1 * | 12/2001 | Funk ................. | G01C 19/5726 73/514.16 |
| 2014/0043614 A1 | 2/2014 | Dhayalan et al. | |

OTHER PUBLICATIONS

French Preliminary Search Report dated Jul. 11, 2019 in French Application 18 60198 filed on Nov. 6, 2018 (with English Translation of Categories of Cited Documents).
(Continued)

*Primary Examiner* — Abdullahi Nur
(74) *Attorney, Agent, or Firm* — Oblon, McClelland, Maier & Neustadt, L.L.P.

(57) ABSTRACT

A measuring device includes a first light source for emitting an excitation beam at an excitation wavelength; and an excitation optical cavity, optically resonant at the excitation wavelength, and arranged such that it receives the excitation beam; a second light source for emitting a measurement beam at a measurement wavelength; and a mechanical element mounted such that it can move about an elastic recovery position and/or such that it is elastically deformable, located both on the optical path of the excitation beam in the excitation optical cavity and on the optical path of the measurement beam, and capable of being displaced and/or deformed by the excitation beam. One of either the excitation beam or the measurement beam is capable of causing the movable and/or deformable mechanical element to oscillate. The measuring device can in particular be used as a gas sensor or as a mass spectrometer.

15 Claims, 6 Drawing Sheets

(51) Int. Cl.
*G01N 21/3504* (2014.01)
*G01N 21/39* (2006.01)

(56) References Cited

OTHER PUBLICATIONS

Malara, P, et al., "Sensitivity enhancement of off-axis ICOS using wavelength modulation", Applied Physics B, Lasers and Optics (2012), 7 pages.
Romanini, D, et al., "Fast, low-noise, mode-by-mode, cavity-enhanced absorption spectroscopy by diode-laser self-locking", Applied Physics B, Lasers and Optics (2005), 13 pages.
Ma, C, et al., "Optical fiber tip acoustic resonator for hydrogen sensing", Optics Letters, Optical Society of America, US, vol. 35, No. 12, Jun. 15, 2010, pp. 2043-2045, XP001554854.
Hossein-Zadeh, M. et al., "An Optomechanical Oscillator on a Silicon Chip", IEEE Journal of Selected Topics in Quantum Electronics, vol. 16, No. 1, Jan. 2010, pp. 276-287, XP055485590.

* cited by examiner

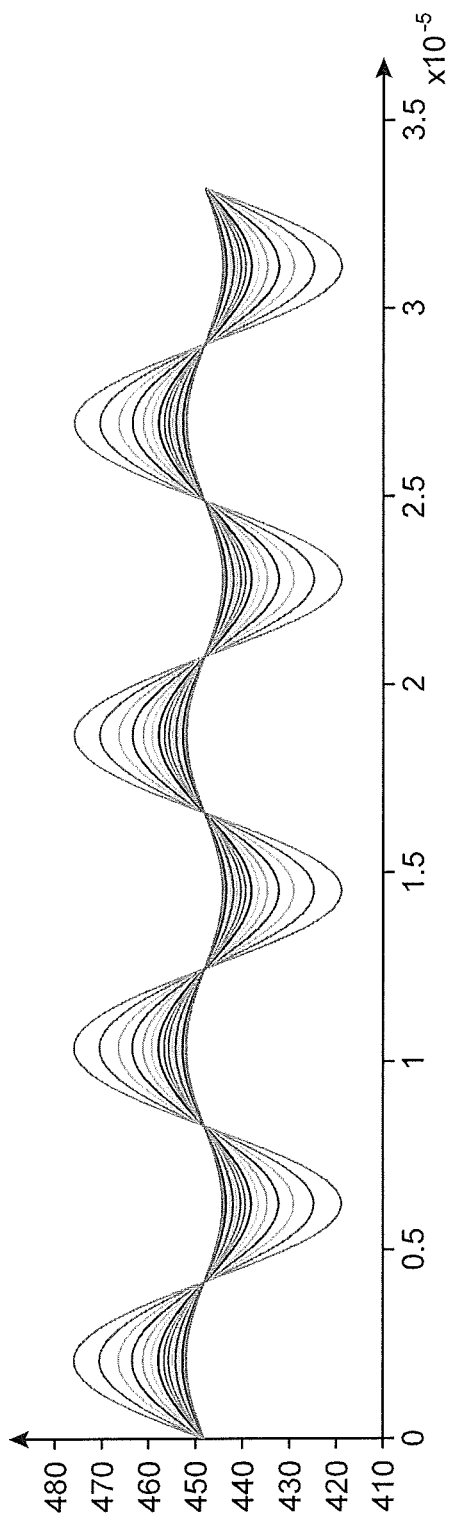
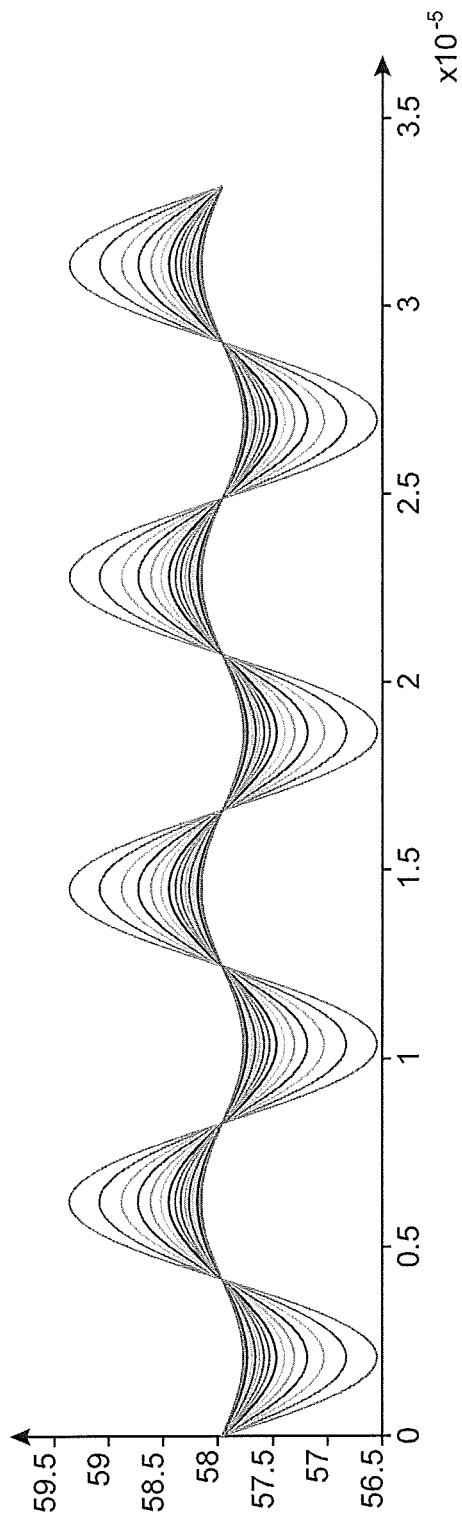
FIG.4A
FIG.4B

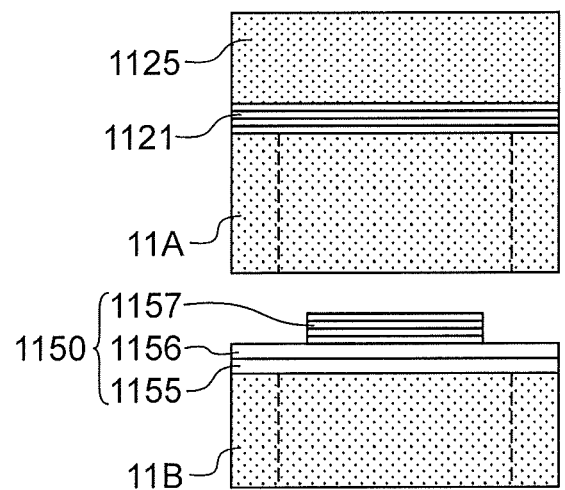
FIG.11A
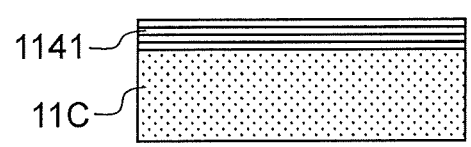
FIG.11B
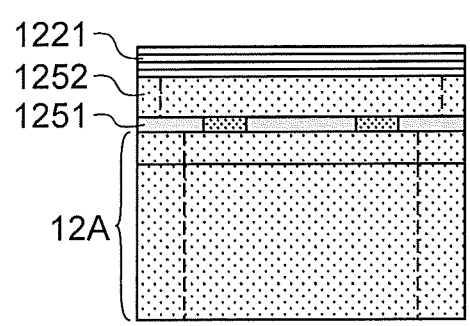
FIG.11C
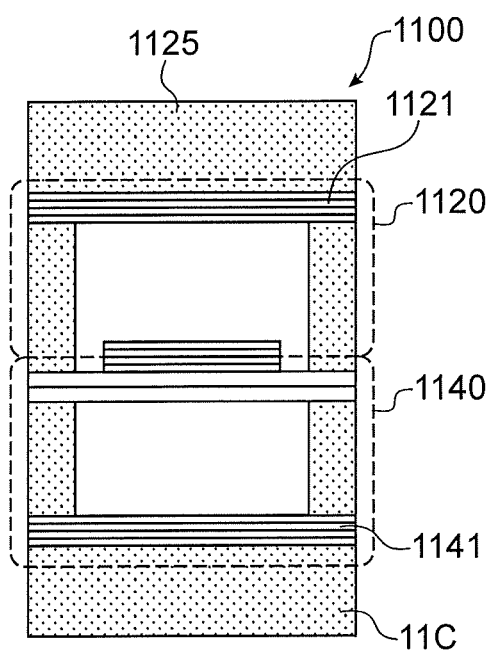
FIG.11D
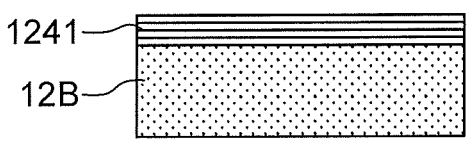
FIG.12A
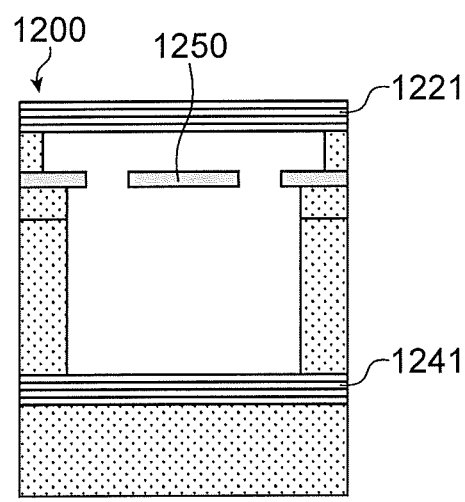
FIG.12B
FIG.12C

MEASURING DEVICE BASED ON AN OPTICAL MEASUREMENT IN AN OPTO-MECHANICAL CAVITY

TECHNICAL FIELD

The invention relates to the field of optical measuring devices, designed in particular for but not limited to measuring a concentration of a gas.

PRIOR ART

Numerous optical devices are known in the prior art for measuring a concentration of a gas, based on the capability of each gas to absorb light at very specific wavelengths (absorption lines).

Mention can be made, for example, of the so-called CEAS or "cavity enhanced absorption spectroscopy" technique, wherein a light beam at an absorption wavelength characteristic of a gas is injected into an optically resonant cavity. When the cavity is filled with this gas, the light beam is partially absorbed by the gas in the cavity. The absorption is especially efficient since the light beam carries out numerous forward-return movements inside the cavity. The measurement of the light intensity transmitted by the cavity provides information on the concentration of the gas inside the cavity.

One drawback of this technique in particular resides in the fact that the laser source supplying the light beam has random mode variations which make the device unstable and noisy. Various solutions have been proposed to increase stability.

For example, in the so-called OA-CEAS or "off-axis CEAS" technique, resonant coupling to a single cavity mode is intentionally prevented. For this purpose, the laser beam injected into the cavity is aligned off-axis relative to the axis of the cavity, and follows a trajectory tracing an elliptical pattern on the mirrors that delimit the cavity. The light intensity is measured at the output of the cavity, integrated over the entire elliptical pattern. This technique is described, for example, by P. Malara et al., in the article entitled "Sensitivity enhancement of off-axis ICOS using wavelength modulation", Appl Phys B, Lasers and Optics (2012).

Alternatively, a part of the resonant photons of the cavity is used as feedback on the laser source, in order to force an emission at the exact resonance frequencies of the cavity. This technique is described, for example, by D. Romanini et al., in the article entitled "Fast, low-noise, mode-by-mode, cavity-enhanced absorption spectroscopy by diode-laser self-locking", Appl Phys B, Lasers and Optics (2005).

However, each of these solutions forms a complex device of large overall dimensions.

One purpose of the present invention is to propose a measuring device that in particular allows a concentration of a gas to be measured, and that is capable of having reduced overall dimensions as well as being simple to manufacture and configure.

DESCRIPTION OF THE INVENTION

This purpose is achieved using a measuring device that includes:
- a first light source, configured such that it emits an excitation light beam with at least one emission peak centred at an excitation wavelength;
- a so-called excitation optical cavity, optically resonant at said excitation wavelength, and configured such that it receives, at the input, said excitation light beam;
- a second light source, configured such that it emits a measurement light beam with an emission peak centred at a measurement wavelength; and
- a movable and/or deformable mechanical element mounted such that it can move about an elastic recovery position and/or such that it is elastically deformable, located both on the optical path of the excitation light beam in the excitation optical cavity and on the optical path of the measurement light beam, and capable of being displaced and/or deformed by the excitation light beam;

one of either the excitation light beam or the measurement light beam being capable of causing the movable and/or deformable mechanical element to oscillate.

Preferably, it is the excitation light beam that is capable of causing the movable and/or deformable mechanical element to oscillate, thanks to a light intensity that exceeds that of the excitation light beam and in particular by a self-oscillation phenomenon (described hereinbelow).

The excitation optical cavity and the movable and/or deformable mechanical element jointly form an opto-mechanical cavity, wherein an optical phenomenon and a mechanical phenomenon interact with one another. In particular, the excitation light beam confined in the excitation optical cavity is capable of displacing and/or deforming the movable and/or deformable mechanical element according to an oscillating movement.

The interaction between an optical phenomenon and a mechanical phenomenon allows a measurement to be carried out on the mechanical phenomenon (measurement of the displacement or deformation of the movable and/or deformable mechanical element) rather than directly on the optical phenomenon (measurement of a property of the excitation light beam). The stability flaws mentioned in the introduction are thus overcome, without further complicating the device, and in particular without increasing the overall dimensions thereof.

According to the invention, the measurement on the mechanical phenomenon is carried out using the measurement light beam, which is separate from the excitation light beam. This optical measurement has the advantage of procuring high precision for low overall dimensions. Moreover, the optical properties of the light beam used for the measurement are thus decorrelated from the optical properties of the light beam absorbed by the gas, which allows the detection to be carried out in wavelength ranges for which particularly efficient detectors are available. In particular, the light beam absorbed by the gas (excitation light beam) can be located in the mid-infrared region, which is the most advantageous spectral range for gas spectrometry, whereas the light beam used for the measurement (measurement light beam) can be located in the visible region, in a spectral range that does not require the use of a cooled detector of the MCT (Mercury Cadmium Telluride) type to measure a signal.

Finally, the optical measurement appears particularly advantageous in alternative embodiments of the invention, wherein the mechanical element mounted such that it is capable of moving and/or being deformed belongs both to the excitation optical cavity and to a measurement optical cavity receiving the measurement light beam.

The measuring device according to the invention provides an improved detection limit and improved stability compared to CEAS-type systems based on a single resonant cavity, while having smaller overall dimensions and a lower complexity than the more complex systems presented in the introduction hereto.

Preferably, the measurement wavelength is located in the visible and near-infrared spectrum, between 380 nm and 1 µm, and the excitation wavelength is located outside of the visible and near-infrared spectrum.

Advantageously, the excitation light beam is capable of causing the movable and/or deformable mechanical element to oscillate, and the measurement light beam has a light intensity that is at most half that of the excitation light beam.

The excitation wavelength advantageously corresponds to the maximum of a resonance peak of the excitation optical cavity in equilibrium, the excitation optical cavity being considered to be in equilibrium when the movable and/or deformable mechanical element is located in a central position between two end positions of the oscillating movement thereof.

The device according to the invention can further comprise a so-called measurement optical cavity, optically resonant at said measurement wavelength and configured such that it receives, at the input, the measurement light beam, with the movable and/or deformable mechanical element belonging both to the excitation optical cavity and to the measurement optical cavity.

The measurement wavelength can thus be situated on a resonance peak of the measurement optical cavity in equilibrium, the measurement optical cavity being considered to be in equilibrium when the movable and/or deformable mechanical element is located in a central position between two end positions of the oscillating movement thereof.

The measurement wavelength can in particular be located on a slope of said resonance peak.

Advantageously, a first face of the movable and/or deformable mechanical element is optically reflective at the excitation wavelength, and a second face of the movable and/or deformable mechanical element, opposite said first face, is optically reflective at the measurement wavelength, with the excitation optical cavity extending on the same side as the first face of the movable and/or deformable mechanical element and the measurement optical cavity extending on the same side as the second face of the movable and/or deformable mechanical element.

The excitation optical cavity and the measurement optical cavity can at least partially cover one another, with the movable and/or deformable mechanical element extending in a region located both within the excitation optical cavity and within the measurement optical cavity.

Preferably, the movable and/or deformable mechanical element extends along a surface area in the range 100*100 µm$^2$ to 10*10 mm$^2$.

At least one region within the excitation optical cavity can be adapted such that it receives a gaseous or liquid medium, with the excitation wavelength corresponding to an absorption wavelength characteristic of a predetermined gas or liquid, such that during operation, the presence of said predetermined gas or liquid in the excitation optical cavity modifies the oscillation of the movable and/or deformable mechanical element. Preferably, the movable and/or deformable mechanical element thus extends inside a housing in a vacuum.

Alternatively, the movable and/or deformable mechanical element can include a receiving area for receiving one or more particles, with the movable and/or deformable mechanical element being configured such that, during operation, the oscillation thereof is modified by the presence of said particles on the receiving area.

The invention further relates to a system comprising an interferometer, one of the arms whereof includes the measurement optical cavity.

BRIEF DESCRIPTION OF THE FIGURES

The present invention will be better understood after reading the following description of example embodiments, given for purposes of illustration only and not intended to limit the scope of the invention, and with reference to the accompanying figures, wherein:

FIGS. 4A and 4B show the light intensity, respectively the phase, of the measurement light beam emerging from the device in FIG. 1;

FIGS. 11A to 11D and 12A to 12C respectively show two methods for producing a measuring device according to the invention.

DETAILED DESCRIPTION OF SPECIFIC EMBODIMENTS

Figure 1:
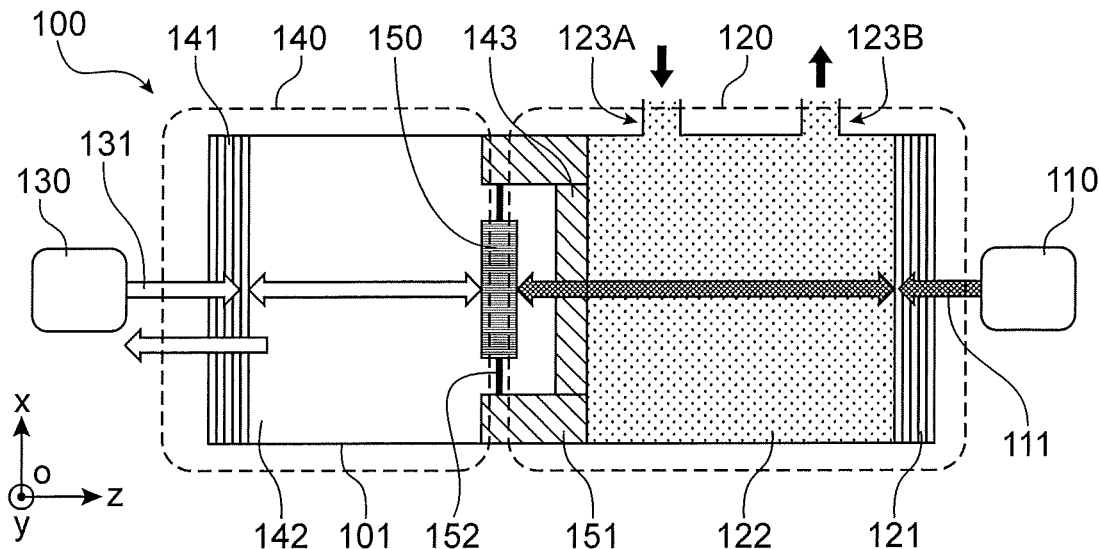
FIG. 1 diagrammatically shows a first embodiment of a measuring device according to the invention.

FIG. 1 diagrammatically shows a first embodiment of a measuring device 100 according to the invention, in this case more particularly forming a gas sensor for measuring a concentration of a predetermined gas.

The device 100 is shown by way of a sectional view in the plane (xOz) of an orthonormal frame of reference (Oxyz).

The device 100 in this case includes:
- a first light source 110;
- a first optical cavity 120, referred to as an excitation optical cavity;
- a second light source 130; and
- a second optical cavity 140, referred to as a measurement optical cavity.

The first light source 110 is formed by a laser source, with an emission spectrum that has one or more emission peaks, each of which is centred at a respective excitation wavelength $\lambda_E$, where $\lambda_E$ corresponds to an absorption line characteristic of the gas whose concentration is to be measured. An excitation wavelength $\lambda_E$ preferably lies in the range 1 µm to 15 µm, and more preferably between 3 µm and 12 µm (mid-infrared region). This range of wavelengths groups together the wavelengths that can be used to identify numerous gaseous compounds, in particular alkanes, volatile organic compounds, and sulphur or nitrogen oxides, etc. For example, we have $\lambda_E$=4.23 µm, which corresponds to one of the absorption wavelengths of carbon dioxide. According to other alternative embodiments, an excitation length $\lambda_E$ can be located in the ultra-violet region, for example to detect ozone (at 254 nm). The first light source 110 is formed, for example, by a quantum cascade laser (QCL). The light beam emitted by the first light source 110 is called an excitation light beam 111. In use, the excitation light beam 111 propagates along the axis (0z) as far as the excitation optical cavity 120.

The excitation optical cavity 120 is a Fabry-Pérot cavity, in this case a linear cavity aligned along the axis (0z) and delimited by an input mirror 121 and a bottom mirror. It has a length of several centimetres along the axis (0z). Preferably, the quality factor of the excitation optical cavity 120 is greater than or equal to $10^4$ and even $10^5$, thanks to high-quality mirrors (reflectivity of greater than or equal to 98% for example). By way of example, without absorption by a gaseous medium in the excitation optical cavity 120, a quality factor of about 150,000 and a finesse of about 1,000 is used, whereby these values vary slightly as a function of the absorption. The excitation optical cavity 120 is optically resonant at the excitation wavelength $\lambda_E$. The bottom mirror is formed, in this case, by an oscillating mechanical element 150 that is reflective at the excitation wavelength $\lambda_E$. In use, the excitation light beam 111 carries out several forward-return movements in the excitation optical cavity 120.

The second light source 130 is formed by a laser source emitting in the visible or near-infrared spectrum, at wavelengths located between 380 nm and 1 μm for which photodetectors exist having excellent detection performance levels. The emission spectrum of the second light source 130 has in particular an emission peak centred at a so-called measurement wavelength, $\lambda_D$, where for example $\lambda_D$=830 nm. The light beam emitted by the second light source 130 is called a measurement light beam 131. In use, the measurement light beam 131 propagates along the axis (0z) as far as the measurement optical cavity 140, where it carries out several forward-return movements before emerging therefrom. The measurement light beam 131 is preferably a continuous signal.

The measurement optical cavity 140 is a Fabry-Perot cavity, in this case a linear cavity aligned along the axis (0z), and delimited by an input mirror 141, and a bottom mirror. Preferably, the quality factor of the measurement optical cavity 140 is greater than or equal to $10^4$, thanks to high-quality mirrors (reflectivity of greater than or equal to 95% for example). By way of example, a quality factor of about 73,000 and a finesse of about 30 is used. The measurement optical cavity 140 is optically resonant at the measurement wavelength $\lambda_D$. The bottom mirror is formed, in this case, by the oscillating mechanical element 150 that is also reflective at the measurement wavelength $\lambda_D$.

The oscillating mechanical element 150 acts as a bottom mirror for each of these two cavities 120 and 140. It extends between the two optical cavities 120 and 140. The oscillating mechanical element 150 is elastically deformable, capable of being mechanically deformed in response to the application of an external mechanical force, and of recovering the initial shape thereof once the application of said force is stopped. When at rest, it preferably extends along a plane (x0y) that is orthogonal to the axis (0z), with one of the two optical cavities 120 and 140 on either side. In response to the application of a mechanical force oriented along the axis (0z), the oscillating mechanical element 150 bends towards either one of the optical cavities 120 and 140. The oscillating mechanical element 150 thus forms a movable and/or deformable mechanical element according to the invention, capable of being deformed under the effect of a pressure force, and of recovering the initial shape thereof when it is no longer subjected to this pressure force. In particular, the oscillating mechanical element 150 is capable of being deformed by bending, under the effect of a pressure force oriented along the axis (0z).

The oscillating mechanical element 150 is, in this case, formed by a membrane coated in one or more reflective coatings. Preferably, each of the one or more reflective coatings extends over the entire surface of the membrane, in a plane parallel to the plane (0xy). Each reflective coating can be formed by a thin layer of metal, for example silver or gold. The oscillating mechanical element 150 includes, for example, two reflective coatings, respectively covering either face of the membrane, and forming the bottom mirror respectively for the excitation optical cavity and the measurement optical cavity. Alternatively, the same reflective coating can form both the bottom mirror of the excitation optical cavity and the bottom mirror of the measurement optical cavity. The membrane itself is made, for example, of silicon nitride. The oscillating mechanical element 150 has, in a plane parallel to the plane (0xy), a surface area that lies in the range 100*100 μm$^2$ and several mm$^2$, for example a 1 mm$^2$ square. The thickness thereof (along (0z)) lies in the range several tens of nanometres to several micrometres, for example 50 nm. The oscillating mechanical element 150 is mounted such that it is integral with a peripheral support 151, and tensioned inside said peripheral support 151 with a biaxial tensile stress in the order of 100 MPa. The oscillating mechanical element 150 can thus oscillate about a position of equilibrium, similarly to a drum. Such a dimensioning of the oscillating mechanical element 150 allows mechanical resonant frequencies of several Mhz to be attained. The peripheral support 151 has preferably undergone anti-reflection treatment at the excitation wavelength so as to minimise the impact thereof on the excitation light beam.

In the example shown in FIG. 1, the oscillating mechanical element 150 is mounted such that it is integral with the peripheral support 151, via a peripheral connector 152. The peripheral connector can be formed by a washer, or by a series of arms, extending between the oscillating mechanical element 150 and the peripheral support 151 while surrounding the oscillating mechanical element 150. The peripheral connector 152 is optional. It can be rigid.

According to one alternative embodiment of the invention, the peripheral connector 152 is elastically deformable, whereas the oscillating mechanical element 150 forms a rigid element. In particular, the peripheral connector 152 is capable of being mechanically deformed in response to the application of an external mechanical force, and of recovering the initial shape thereof once the application of said force is stopped. When at rest, the peripheral connector 152 preferably extends along a plane (x0y) that is orthogonal to the axis (0z), with one of the two optical cavities 120 and 140 on either side. When a mechanical force oriented along the axis (0z) is exerted on the oscillating mechanical element 150, the latter moves in translation along the axis (0z), driving therewith the peripheral connector 152 which is deformed. The elasticity of the peripheral connector 152 allows the oscillating mechanical element 150 to be brought back to the initial position thereof, when said mechanical force is no longer exerted on the oscillating mechanical element 150. The oscillating mechanical element 150 thus forms a movable and/or deformable mechanical element according to the invention, capable of moving in translation along the axis (0z) about an elastic recovery position. The elastic recovery position corresponds to the position of the oscillating mechanical element 150 along the axis (0z), in the absence of any application thereon of an external mechanical force oriented along the axis (0z). According to other alternative embodiments, the oscillating mechanical element 150 can be both elastically deformable and capable of moving in translation about an elastic recovery position.

The measurement optical cavity and the excitation optical cavity jointly extend inside an enclosure 101 having at least two hermetically sealed housings.

A first housing 122 is located inside the excitation optical cavity 120, and configured such that it receives a gaseous medium on which a concentration measurement is to be carried out. In FIG. 1, two openings 123A, 123B in the enclosure 101 have been diagrammatically illustrated, respectively forming an input and an output for the intake of a gaseous medium into the housing 122, and respectively for the output of the gaseous medium from the housing 122.

A second housing 142 is placed in a vacuum and extends both in the excitation optical cavity and in the measurement optical cavity while surrounding the oscillating mechanical element 150. The second housing 142 forms a vacuum housing for the oscillating mechanical element. The term vacuum herein refers to a medium at a pressure of less than $10^{-5}$ bar and even of less than or equal to $10^{-6}$ bar (where 1 bar is equivalent to $10^5$ Pa). Given that the oscillating mechanical element is in a vacuum, it can form a mechanical oscillator with a high quality factor capable of reaching from $10^4$ to $10^5$.

In this case, the housing 142 extends over the entire measurement optical cavity 140, and over a part of the excitation optical cavity 120, while being separated from the housing 122 by a sealing plate 143. The sealing plate isolates the two housings 121, 142 from one another. It is transparent at the wavelength of the excitation light beam 111. Preferably, it has undergone anti-reflection treatment at this wavelength.

The placement of the oscillating mechanical element in a vacuum is not a necessary component of the invention, and alternatives can be implemented, wherein the measurement optical cavity and the excitation optical cavity are both entirely filled with the medium to be analysed.

Figure 2A:
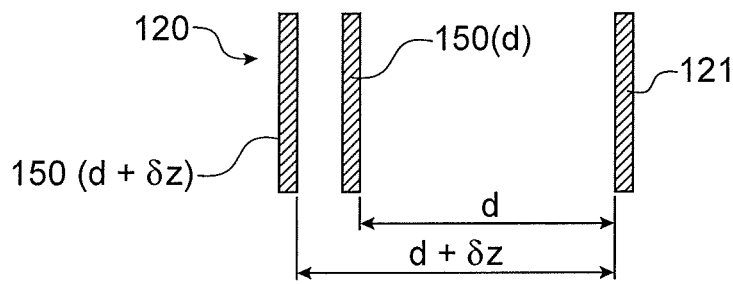
FIGS. 2A and 2B show the relationship, in an optically resonant cavity, between the position of the bottom mirror and the resonance wavelength.
Figure 2B:
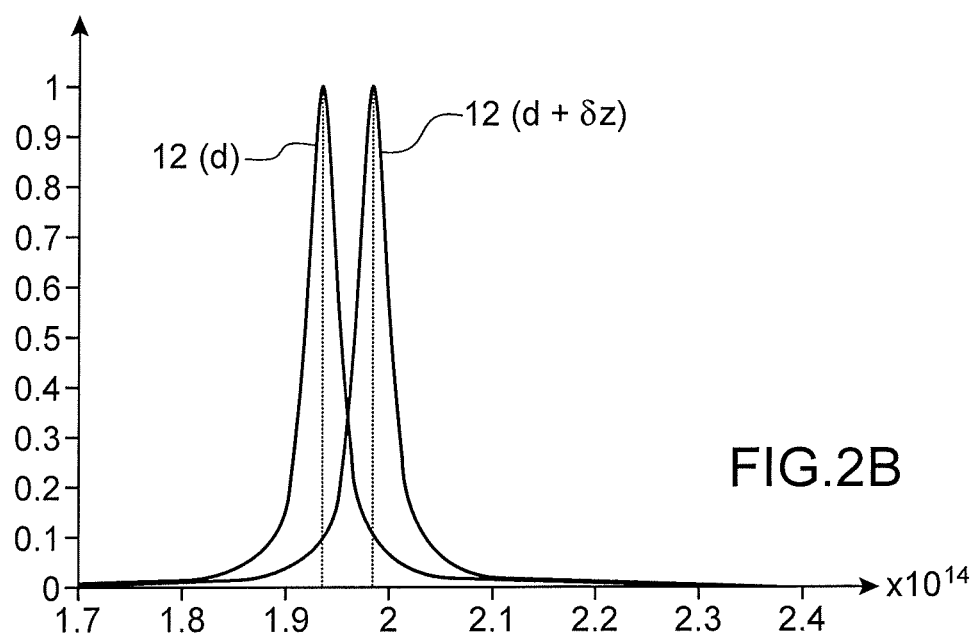

In order to better understand the paragraphs below, FIGS. 2A and 2B show the relationship between the position of the oscillating mechanical element 150 and the position of the resonance peaks of the excitation optical cavity 120.

FIG. 2A diagrammatically shows the excitation optical cavity 120, for two positions of the oscillating mechanical element 150, respectively at a distance d and at a distance d+δz from the input mirror 121. The two positions of the oscillating mechanical element 150 are respectively noted 150(d) and 150(d+δz).

FIG. 2B shows the spectral position of the resonance of the excitation optical cavity, when the oscillating mechanical element 150 is located at a distance d from the input mirror 121, respectively d+δz. The abscissa is an optical frequency in Hz, the optical frequency and wavelength being linked by the celerity of the light in the vacuum. The ordinate is a transfer function, without units, corresponding to an energy density reflected or transmitted by the optical cavity, and normalised to unity at the reflection or transmission maximum. The resonance results in a peak, referred to as a resonance peak, on the transfer function of the optical cavity as a function of the frequency. FIG. 2B shows that the spectral position of the resonance depends on the position of the oscillating mechanical element 150. The two positions of the resonance peak are respectively noted 12(d) and 12(d+δz).

During operation, the excitation light beam 111 is confined in the excitation optical cavity 120, where it forms a standing wave which exerts a radiation pressure on the oscillating mechanical element 150. This radiation pressure forms an external mechanical force oriented along the axis (Oz), capable of elastically deforming the oscillating mechanical element and/or displacing same about an elastic recovery position. In the example shown in FIG. 2, the radiation pressure slightly displaces the oscillating mechanical element along the axis (Oz). This displacement very slightly modifies the resonance wavelength of the excitation optical cavity 120. Given that the wavelength of the excitation light beam 111 no longer accurately corresponds to the resonance wavelength of the excitation optical cavity 120, the radiation pressure exerted on the oscillating mechanical element 150 is reduced, such that it returns to the initial position thereof, where it will be re-subjected to a high radiation pressure. The oscillating mechanical element thus undertakes a mechanical oscillating movement at a frequency $f_1$, referred to as self-oscillation. If the excitation light beam 111 is continuous, the frequency $f_1$ of self-oscillation is fixed by the geometric properties of the excitation optical cavity 120 and of the oscillating mechanical element. If the excitation light beam 111 is amplitude-modulated, $f_1$ corresponds to the modulating frequency of the beam 111. An amplitude-modulated excitation light beam 111 allows, for example, only certain mechanical modes of interest of the oscillating mechanical element 150 to be excited. In any case, h is generally greater than 500 kHz, for example equal to 1 MHz.

The same phenomenon occurs when the radiation pressure slightly deforms the oscillating mechanical element by bending it along the axis (Oz).

To prevent a too great radiation pressure from being generated in the measurement optical cavity which could disrupt the oscillation of the oscillating mechanical element generated by the excitation light beam 111, the light power of the measurement light beam 131 is chosen such that it is much lower than that of the excitation light beam 111. In this way, the radiation pressure exerted on the oscillating mechanical element 150 by the measurement light beam 131 is negligible as regards the radiation pressure exerted by the excitation light beam 111. The ratio of the light power of the excitation light beam divided by the light power of the measurement light beam is greater than or equal to 2, and even greater than or equal to 10. For example, the excitation light beam injected into the excitation optical cavity 120 has a light power $P_E$=10 µW, and the measurement light beam injected into the measurement optical cavity 140 has a light power $P_D$=1 µW. In the paragraphs below, the terms light intensity and light power will be used indifferently, these two values being related.

During operation, the oscillating mechanical element 150 is thus caused to oscillate under the effect of a radiation pressure exerted by the excitation light beam 111 confined in the excitation optical cavity 120.

The distance between the input mirror 121 of the excitation optical cavity 120 and the input mirror 141 of the measurement optical cavity 140 is fixed. As a result, the oscillation of the oscillating mechanical element 150 produces an oscillation of the length of the measurement optical cavity 140, and thus an oscillation of the spectral position of the resonance peaks thereof. Said oscillation of the spectral position of the resonance peaks results in an amplitude modulation on the measurement light beam transmitted or reflected by the measurement optical cavity 140, emerging therefrom after having undergone multiple forward-return movements therein.

During operation, and in the presence of carbon dioxide in the housing 122, the carbon dioxide partially absorbs the excitation light beam circulating in the excitation optical cavity, with a rate of absorption that depends on the concentration of carbon dioxide. This absorption consequently reduces the radiation pressure that is exerted on the oscillating mechanical element. As a result, the amplitude of the oscillations of the oscillating mechanical element 150 is reduced, which produces a variation in the properties of the measurement light beam emerging from the measurement optical cavity 140 after having undergone multiple passages. In particular, the modulation amplitude and the phase of the measurement light beam emerging from the measurement optical cavity are modified.

The measurement light beam emerging from the measurement optical cavity 140 in particular satisfies the following condition:

$$\delta I_R = \frac{3\sqrt{3}}{4} \frac{C_R Q_{opt}}{v_R} I_0 \frac{g \delta z}{2\pi} \qquad (1)$$

where $\delta I_R$ is the peak-to-peak amplitude of the light intensity modulation of the measurement light beam emerging from the measurement optical cavity 140, $\delta z$ is the displacement of the oscillating mechanical element 150, g is the opto-mechanical coupling coefficient connecting the optical resonance in the excitation optical cavity and the mechanical displacement of the oscillating mechanical element, $Q_{opt}$ is the optical quality factor of the excitation optical cavity, $v_R$ is the optical resonance frequency of the excitation optical cavity, and $$C_R = \frac{I_{Rmax} - I_{Rmin}}{I_{Rmax}}$$

is the contrast of the measurement light beam emerging from the measurement optical cavity 140.

Figure 3A:
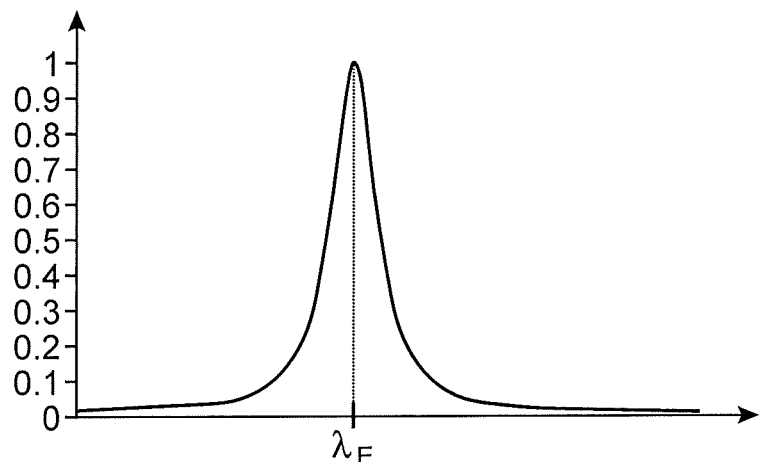
FIG. 3A to 3C show the positioning of the excitation and measurement wavelengths, relative to the respective response spectra of the optical cavities of the device in FIG. 1.
Figure 3B:
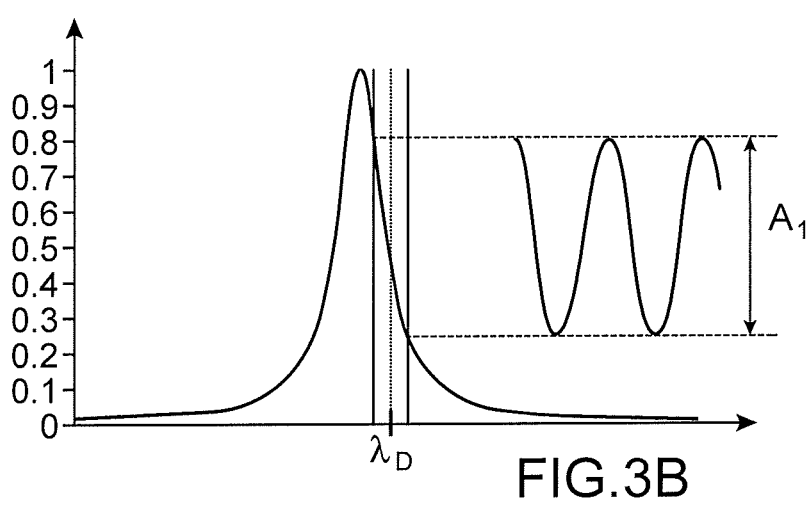
Figure 3C:
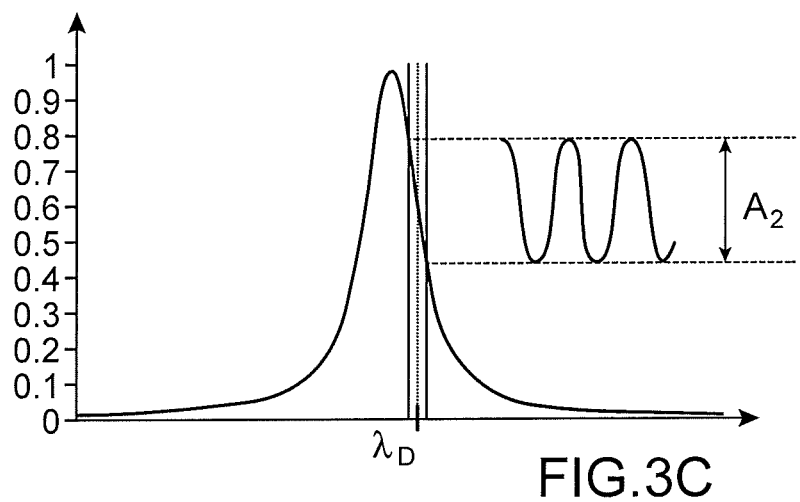

In FIG. 3A to 3C, the abscissa corresponds to a wavelength, and the ordinate corresponds to a transfer function.

Advantageously, and as shown in FIG. 3A, the excitation wavelength $\lambda_E$ corresponds to the central wavelength of a resonance peak of the excitation optical cavity 120 in equilibrium, in the absence of any absorption of the excitation light beam by a gas in the excitation optical cavity 120. The excitation optical cavity 120 is considered to be in equilibrium when the oscillating mechanical element 150 is located in a central position between the two end positions of the oscillating movement thereof.

As shown advantageously in FIG. 3B, the measurement wavelength $\lambda_D$ is situated on a slope of a resonance peak of the measurement optical cavity 140 in equilibrium, in the absence of any absorption of the excitation light beam by a gas in the excitation optical cavity 120. The measurement optical cavity 140 is considered to be in equilibrium when the oscillating mechanical element 150 is located in a central position between the two end positions of the oscillating movement thereof. This positioning of the measurement wavelength $\lambda_D$ relative to the resonance peak of the measurement optical cavity 140 allows the variation in the measurement light beam generated by the movement of the oscillating mechanical element 150 to be maximised. More particularly, by being placed in a near-rectilinear area of the resonance peak, halfway along the height of the peak, the linearity of the relationship between the displacement and/or deformation of the oscillating mechanical element 150, and variations in phase and modulation amplitude on the measurement light beam emerging from the measurement optical cavity is also guaranteed.

FIG. 3B shows, by way of vertical lines, the two end positions of the measurement wavelength $\lambda_D$ relative to the resonance peak, during the oscillating movement of the oscillating mechanical element 150, and in the absence of any absorption of the excitation light beam by the gas. Formally, the measurement wavelength $\lambda_D$ remains fixed, and it is the resonance peak that is displaced. For clarity purposes, the figure shows a fixed resonance peak, and a measurement wavelength that is displaced. The oscillation of the spectral position of the resonance peak results in an amplitude modulation on the measurement beam emerging from the measurement optical cavity 140. Said modulation has a peak-to-peak amplitude $A_1$.

Similarly, FIG. 3C shows, by way of vertical lines, the two end positions of the measurement wavelength $\lambda_D$ relative to the resonance peak, during the oscillating movement of the oscillating mechanical element 150, and after absorption of a part of the power of the excitation light beam by the gas. This time, the measurement light beam emerging from the measurement optical cavity 140 has a peak-to-peak amplitude $A_2$, where $A_2 < A_1$.

FIG. 4A shows the light power of the measurement light beam emerging from the measurement optical cavity 140, as a function of time, and for different carbon dioxide concentrations in the housing 122. The abscissa is a time, in seconds. The ordinate is a light power, in nW. The peak-to-peak amplitude of the oscillations of the light power varies by about 5 nW, for a concentration of 1 ppb (part per billion), to about 60 nW, for a concentration of 1 ppm (part per million).

FIG. 4B shows the phase of the measurement light beam emerging from the measurement optical cavity 140, as a function of time, and for different carbon dioxide concentrations in the housing 122. The abscissa is a time, in seconds. The ordinate is a phase, in angular degrees. The peak-to-peak amplitude of the oscillations of the phase varies by about 0.4°, for a concentration of 1 ppb (part per billion), to about 3°, for a concentration of 1 ppm (part per million).

It can thus be seen that the carbon dioxide concentration can be deduced from a measurement of the light power and/or optical phase, as a function of time, on the measurement light beam emerging from the measurement optical cavity 140.

The measuring device according to the invention allows an entirely satisfactory detection limit to be obtained, for example 400 ppt (par per trillion) for carbon dioxide, and for an integration time of one second (considering a measuring detector noise of 1 pW/s).

The measuring device 100 according to the invention also has the advantage of the light beam to be measured being separate from the light beam absorbed by the gas. The respective wavelengths of one or the other can thus be determined according to separate criteria. In particular, the wavelength of the measurement light beam can be determined as a function of the detection performance levels of the known photodetectors, without the need to remain within the wavelength ranges including absorption lines that are characteristic of a gas to be detected.

A phenomenon is described hereinbelow which amplifies the absorption effect of the excitation light beam in the measuring device 100 according to the invention. More specifically, this absorption has the additional effect of reducing the optical forces that are applied, on average, on the oscillating mechanical element 150, which consequently modifies the position of equilibrium thereof, i.e. the central position of the oscillating movement thereof.

The offset of the position of equilibrium of the oscillating mechanical element results in an offset between the wavelength of the maximum of the resonance peak of the excitation optical cavity 120, and the excitation wavelength $\lambda_E$ of the excitation light beam. This offset thus further contributes to reducing the optical forces exerted on the oscillating mechanical element 150 by the excitation light beam.

In the measurement optical cavity 140, the measurement light beam has a measurement wavelength $\lambda_D$ that is located on the slope of a resonance peak of said cavity. The offset of the position of equilibrium of the oscillating mechanical element results in an offset of the measurement wavelength $\lambda_D$ along this slope. This offset further contributes to amplifying the impact of the absorption of the excitation light beam, on the properties of the measurement light beam emerging from the measurement optical cavity.

Advantageously, the first light source is wavelength-locked using a feedback, by returning towards said light source a part of the photons of the excitation light beam resonant in the excitation optical cavity. The feedback is implemented at constant time intervals, for example once every second. The offsets of the position of equilibrium of the oscillating mechanical element are thus regularly cancelled out, before they deteriorate the correct operation of the measuring device according to the invention. Alternatively, these offsets can be cancelled out by slightly displacing the mirrors of the excitation optical cavity. According to another alternative, the effect produced by these offsets can be cancelled out by adjusting an emitting power of the excitation light beam.

Figure 5:
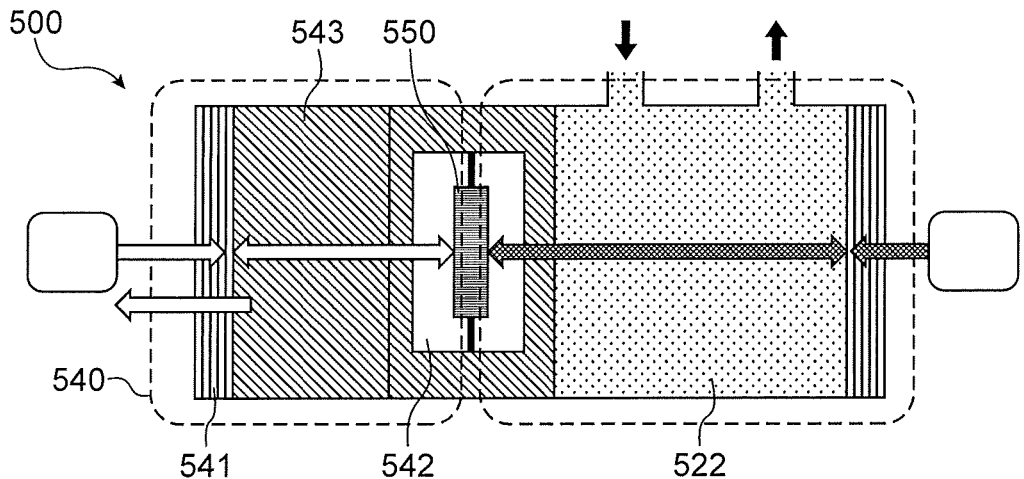
FIG. 5 diagrammatically shows an alternative of the embodiment in FIG. 1.

FIG. 5 shows an alternative 500 of the embodiment in FIG. 1. In this alternative, the housing 542 for placing the oscillating mechanical element in a vacuum has a reduced volume, and extends inside a thick element 543. The thick element 543 is transparent at the measurement wavelength $\lambda_D$. It has a face that is covered by the input mirror 541 of the measurement optical cavity 540. The opposite face is adjoining the housing 522 in order to receive the medium to be analysed. In this embodiment, the volume placed in a vacuum is limited to a small volume surrounding the oscillating mechanical element, which simplifies the vacuum creation operation.

According to another alternative, not shown, a tube passes through the excitation optical cavity, which tube is capable of receiving a medium to be analysed, the remaining excitation and measurement optical cavities being placed in a vacuum.

Figure 6:
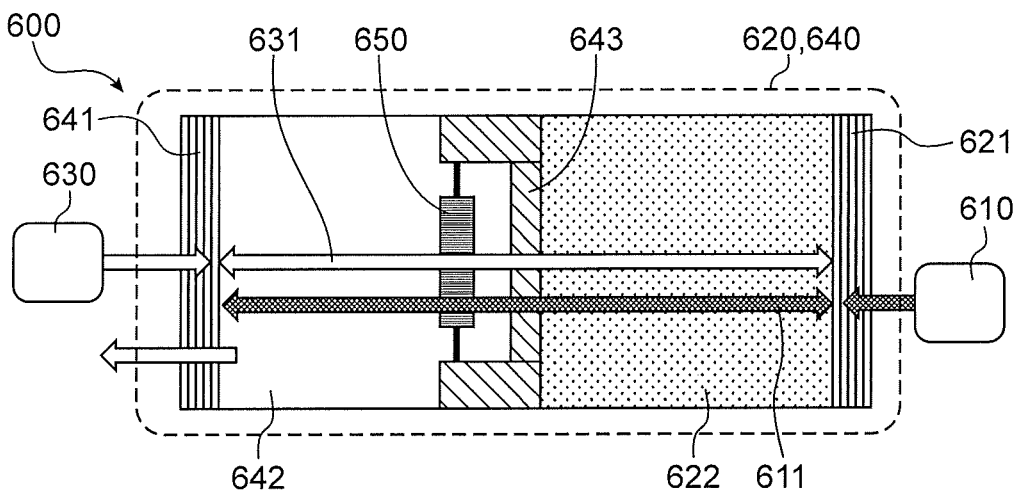
FIGS. 6 to 8 diagrammatically show different alternatives of a second embodiment of a measuring device according to the invention.

FIG. 6 shows a second embodiment of a measuring device 600 according to the invention, wherein the measurement optical cavity 620 and the excitation optical cavity 640 are merged with one another, and each delimited by the two mirrors 641, 621, both highly reflective at the measurement wavelength and at the excitation wavelength. In this case, the first light source 610 extends on the same side as one of said mirrors, and the second light source 630 extends on the same side as the other of said mirrors.

The oscillating mechanical element 650 is transparent, both at the measurement wavelength $\lambda_D$ and at the excitation wavelength $\lambda_E$. It is formed, for example, by the membrane as described hereinabove, without the reflective coatings. The transmission rate at each of these two wavelengths is greater than or equal to 95%, and even greater than or equal to 99%.

Given that the oscillating mechanical element 650 is transparent at the wavelength of the excitation light beam, it is not or barely subjected to the radiation pressure exerted thereby.

During operation, the excitation light beam 611 forms a standing wave in the measurement optical cavity 620. The standing wave is defined by nodes where the amplitude variation thereof is zero, and by anti-nodes where the amplitude variation thereof is maximal. The position of the anti-nodes is defined by the absence of any absorption of the excitation light beam in the measurement optical cavity 620. The oscillating mechanical element 650 is between a node and an anti-node, and preferably close to the output mirror 621, where the output mirror is the mirror located on the opposite side to the mirror via which the measurement light beam 631 is injected into the cavities 620, 640.

The oscillating mechanical element 650 is thus subjected, during operation, to an optical force, this time resulting from the electric field gradient of the standing wave. This optical force allows the oscillating mechanical element to be set in motion, according to a self-oscillating movement similar to that described hereinabove. The self-oscillation of the oscillating mechanical element is thus generated, similarly to in the first embodiment, by an optical force exerted by the excitation light beam confined within the excitation optical cavity. Similarly to in the first embodiment, the oscillation of the oscillating mechanical element 650 is a function of the optical force that is applied thereto. This optical force itself depends on the light power of the excitation light beam in the excitation optical cavity 620. This light power itself depends on the measurement wherein the excitation light beam is absorbed in the excitation optical cavity 620, and thus on a concentration of gas in the excitation optical cavity 620.

During operation, the measurement light beam 631 forms a standing wave in the measurement optical cavity 640 (which is merged, in this case, with the excitation cavity 620). In order to optimise the interactions between the measurement light beam 631 and the oscillating mechanical element 650, the wavelength of the latter is placed in the slope of the response spectrum of the cavities 620, 640. The displacement and/or deformation of the oscillating mechanical element 650 locally modifies the refractive index "experienced" by the measurement light beam 631 in the measurement optical cavity 640. The displacement and/or deformation of the oscillating mechanical element 650 thus modifies the effective length of the measurement optical cavity 640, which corresponds to a modification of the resonance frequency thereof. Thus, similarly to in the first embodiment, the mechanical oscillation of the oscillating mechanical element results in variations in the optical properties of the measurement light beam 631 that emerges from the measurement optical cavity 640 after having undergone multiple forward-return movements therein (in particular variations in the optical phase thereof and/or the modulation amplitude thereof). The measurement of the optical properties of the measurement light beam 631 that emerges from the measurement optical cavity 640 thus provides information on the oscillation of the oscillating mechanical element 650, which ultimately depends on the concentration of gas in the excitation optical cavity 620.

Similarly to the embodiment shown in FIG. 1, the following components are present:

a housing 622 for receiving the gaseous medium to be analysed, in this case extending between the mirror 621 and a sealing plate 643; and a housing 642 placed in a vacuum, receiving the oscillating mechanical element 650, and in this case extending between the sealing plate 643 and the mirror 641.

Figure 7:
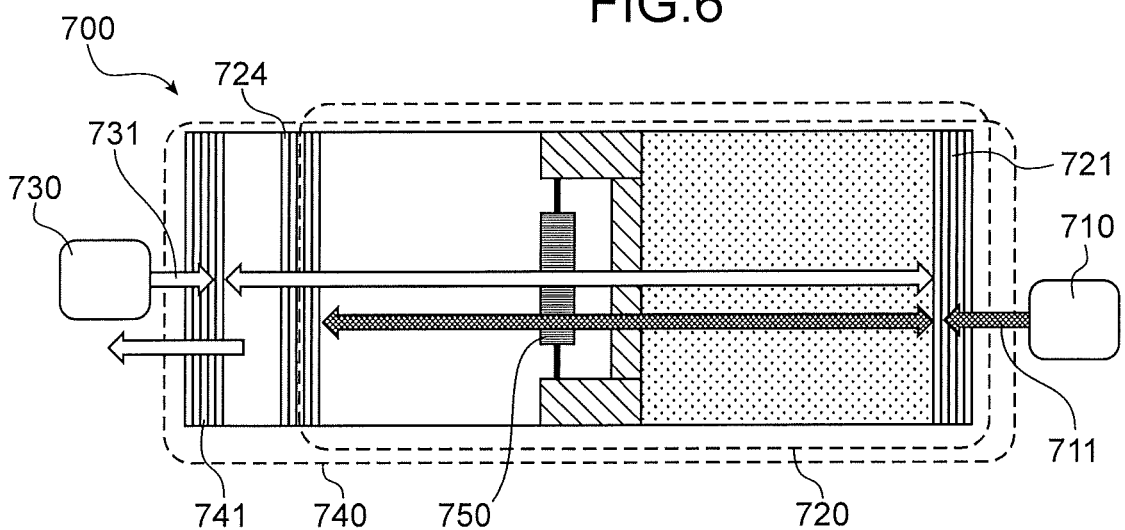

FIG. 7 shows a first alternative wherein the excitation optical cavity 720 and the measurement optical cavity 740 partially cover one another, without being merged with one another. They continue to share at least one end mirror, and the oscillating mechanical element. The measuring device 700 in this case includes three mirrors arranged parallel to one another:

a first end mirror 721, on the same side as the first light source 710, highly reflective at the measurement wavelength and at the excitation wavelength;

a second end mirror 741, on the same side as the second light source 730, highly reflective at the measurement wavelength; and an intermediate mirror 724 which extends between the second end mirror 741 and the oscillating mechanical element 750, and which is transparent at the measurement wavelength and highly reflective at the excitation wavelength.

The excitation optical cavity 720 is delimited by the first end mirror 721 and the intermediate mirror 724. The measurement optical cavity 740 is delimited by the first end mirror 721 and the second end mirror 741. This arrangement allows the length of the excitation optical cavity 720 and of the measurement optical cavity 740 to be independently adjusted. The positioning of the oscillating mechanical element 750 is thus more easily obtained at an anti-node of the excitation light beam confined in the excitation optical cavity, and at an anti-node of the measurement light beam in the measurement optical cavity.

Figure 8:
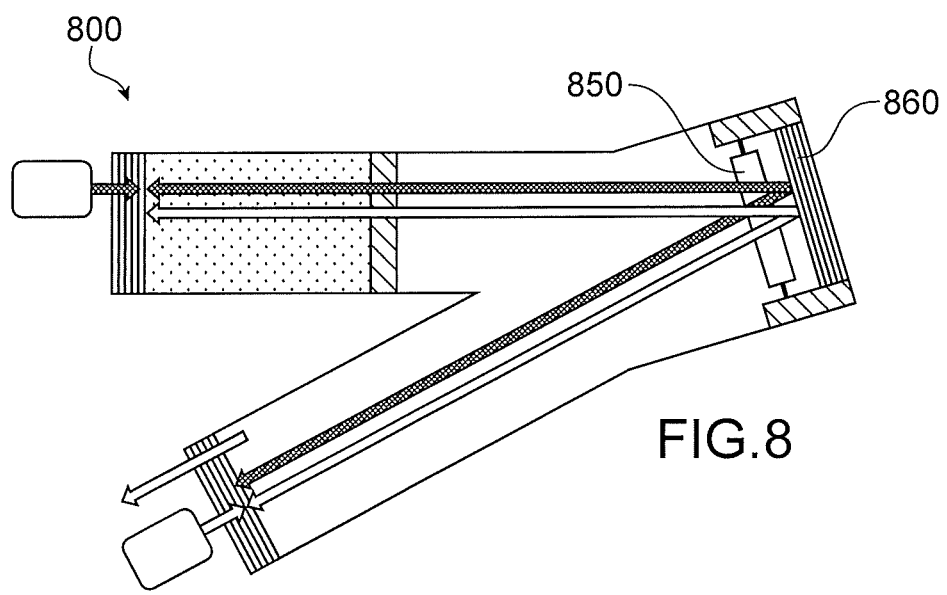

FIG. 8 shows a second alternative 800 wherein the excitation optical cavity and the measurement optical cavity are merged with one another, and have a V-shape (two linear portions inclined relative to one another). The folding of the optical cavities is carried out using an intermediate mirror 860 that is highly reflective at the measurement wavelength and at the excitation wavelength. In this case, the intermediate mirror is directly disposed behind the oscillating mechanical element 850, in the hollow of the V.

Numerous other alternatives can be implemented, for example by combining the alternatives in FIGS. 7 and 8.

The paragraphs above describe examples using a single excitation wavelength. Alternatively, the first light source can emit an excitation light beam having a plurality of emission peaks, each of which is centred at a respective excitation wavelength (where each excitation wavelength can correspond to a respective absorption wavelength of a gas). According to another alternative, the first light source can successively emit different excitation light beams, each having an emission peak centred at a respective excitation wavelength. The concentrations of different gases can thus be detected, and the composition of a gaseous medium can thus be determined. The resonance wavelength of the excitation cavity can be adjustable (in particular by adjusting the length of said cavity) so as to be optically resonant, in turns, at different excitation wavelengths. Alternatively, the excitation optical cavity can have a plurality of resonance wavelengths corresponding to the different excitation wavelengths. The mirrors of the excitation optical cavity must be adapted so as to effectively reflect each of said excitation wavelengths. These mirrors can be formed by a metal deposit, for example gold, or by a stack of dielectric layers.

The measuring device according to the invention can also be used simply to detect the presence of a particular component in a gaseous medium, without necessarily determining the concentration thereof.

According to other alternatives, the excitation optical cavity includes a heater element capable of vaporising a liquid, in order to carry out a measurement regarding a vaporised liquid medium.

Additionally or alternatively, the measuring device according to the invention can be used to implement visible or ultraviolet spectroscopy, according to the wavelength of the excitation light beam. Again, the absorption of the excitation light beam is linked to the excitation of modes of vibration or rotation of the molecules, and allows the nature of said molecules to be identified.

Figure 9:
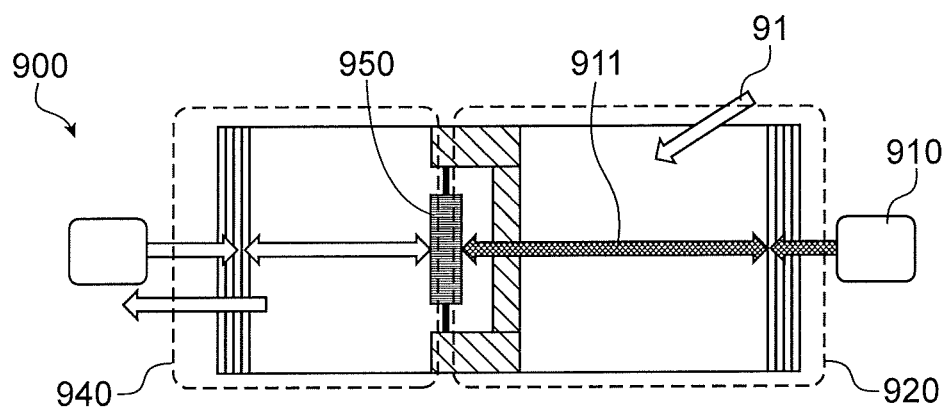
FIG. 9 diagrammatically shows a third embodiment of a measuring device according to the invention.

FIG. 9 shows a third of embodiment of a measuring device 900 according to the invention, in this instance forming a mass spectrometer.

In this embodiment, the oscillating mechanical element is formed by a single membrane 950, one of the faces whereof forms a receiving area for receiving one or more particles. The excitation optical cavity 920 and the measurement optical cavity 940 are both placed in a vacuum, i.e. at a pressure of less than $10^{-5}$ bar and even of less than or equal to $10^{-6}$ bar. A sealing plate designed to separate the two cavities is thus no longer necessary.

During operation, the membrane 950 is made to oscillate by the excitation light beam 911 confined within the excitation optical cavity 920, in the same manner as in the embodiment in FIG. 1. The membrane 950 thus forms an oscillating assembly. A beam of particles 91 is injected into the excitation optical cavity 920 towards the membrane 950. The density of particles in the beam 91 is sufficiently low for it to still be considered that the excitation optical cavity 920 and the measurement optical cavity 940 are placed in a vacuum. When a particle is retained on the membrane 950, the latter jointly form a new oscillating assembly, the mass whereof is greater than that of the oscillating assembly previously formed by the membrane 950 alone. The oscillation of the oscillating assembly is thus modified, in particular the mechanical oscillation frequency thereof. The measurement light beam that emerges from the measurement optical cavity 940 after having undergone multiple forward-return movements therein has properties that are representative of the oscillation of the oscillating assembly. The measurement of these properties thus allows information to be obtained on the one or more particles fixed to the membrane 950. The measuring device 900 according to the invention thus forms a mass spectrometer. The membrane can be coated in an absorption layer having a specific chemical affinity with certain species to be measured. In this third embodiment, the membrane is advantageously made of graphene, preferably of a single-layer graphene. This embodiment enables a mass spectrometer to be produced, which procures both a large capturing section (surface of the membrane) and a high mass sensitivity.

In this embodiment, the excitation wavelength $\lambda_E$ advantageously corresponds to the central wavelength of a resonance peak of the excitation optical cavity in equilibrium, in this case defined in the absence of any absorption of particles by the membrane 950. Similarly, the measurement wavelength $\lambda_D$ is advantageously located on a slope of a resonance peak of the measurement optical cavity in equilibrium, in this case defined in the absence of any absorption of particles by the membrane 950.

In this embodiment, the first light source 910 can emit a light beam in the visible region, since it is not limited to wavelengths corresponding to the absorption lines of a gas. However, it remains advantageous for said first light source to be configured to emit a light beam in the mid-infrared region. Moreover, if it has an adjustable emitting power, it can be used to emit a so-called cleaning light beam. The cleaning light beam takes on the form of a high-power light signal, preferably an impulse signal, the spectrum whereof is located in the mid-infrared region. When it reaches the membrane 950, it induces heating which activates desorption of the particles previously absorbed by the membrane.

The membrane can be excited on a plurality of the mechanical modes thereof, in order to access various information regarding the particle deposited, in particular the mass thereof, the shape thereof and the position thereof on the membrane, etc. Preferably, a mechanical mode of frequency $f_1$ is excited using an amplitude-modulated excitation light beam at said frequency $f_1$.

Numerous alternatives of this embodiment can be implemented, by combining each of the embodiments and alternatives of a gas sensor as described hereinabove.

The invention further relates to a measuring system comprising a measuring device according to the invention and means for carrying out a measurement on the measurement light beam emerging from the measurement optical cavity after having undergone multiple forward-return movements therein.

In a first embodiment, not shown, said means for carrying out a measurement on the measurement light beam are simply formed by a photodetector for measuring a light intensity as a function of time.

Figure 10:
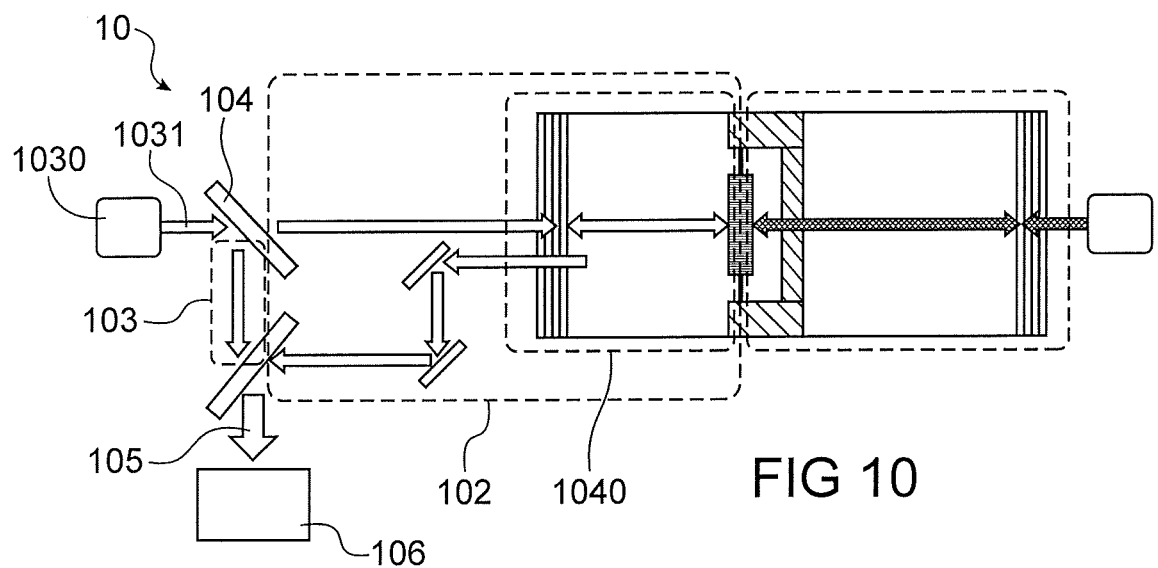
FIG. 10 diagrammatically shows a system including a measuring device according to the invention and means for carrying out a measurement on the measurement light beam emerging from said device.

In a second embodiment shown in FIG. 10, the system 10 includes an interferometer of the Michelson type. The measurement light beam 1031 emitted by the second light source 1030 is split into two sub-beams by a beam splitter 104. The beam splitter 104 directs each of the two sub-beams towards a respective arm 102, 103 of the interferometer. A first arm 102 of the interferometer includes the measurement optical cavity 1040 of a measuring device according to the invention.

The sub-beam emerging from the measurement optical cavity 1040 after having undergone multiple forward-return movements therein is then combined with the sub-beam having circulated on the second arm 103 of the interferometer. The combination of the two sub-beams produces an interference signal 105 which is received by a photodetector 106, for example a photodiode on silicon sensitive at 830 nm. The phase difference between the phase of the measurement light beam entering the measurement optical cavity 1040 and the phase of the same beam emerging from the measurement optical cavity 1040, after having undergone multiple forward-return movements therein, can thus be monitored, as a function of time.

Either of these two measuring systems can further comprise computing means for processing the signal provided by the photodetector, and for deducing therefrom information regarding, for example, a concentration in a gaseous or liquid (vaporised liquid) medium, or a particle deposited on a receiving area.

In the different embodiments described hereinabove, the oscillating mechanical element is made to oscillate using the excitation light beam. Alternatively, it can be made to oscillate using the measurement light beam, which thus has, at the input of the measurement optical cavity, an amplitude modulation and a light power that is sufficient to generate the oscillation. The excitation light beam thus exerts a constant force on the oscillating mechanical element, which skews the oscillating movement thereof.

According to other alternatives, the measuring device does not include any measurement optical cavity. The measurement light beam is simply reflected on the oscillating mechanical element. Information is obtained on the movement of the oscillating mechanical element by simply measuring the phase shift, using an interferometer wherein one of the arms receives the measurement light beam reflected on the oscillating mechanical element.

According to other alternatives, the oscillating mechanical element can form a bottom mirror for the excitation optical cavity and the measurement optical cavity, with these two cavities extending on the same side of the oscillating mechanical element.

In the examples hereinabove, the oscillating mechanical element is formed by a membrane that may or may not be coated in a reflective coating. However, the invention is not limited to this example. The oscillating mechanical element can, for example, be formed by a beam or a tuning fork, etc. In any case, the oscillating mechanical element has dimensions of the same order of magnitude as the spatial modes of the excitation light beam and of the measurement light beam, preferably slightly lower so as to have uniform light powers at the surface of the oscillating mechanical element.

The invention is not limited to optical cavities formed by flat mirrors, which can comprise mirrors that are flat and/or concave and/or convex and/or that have a more complex shape.

In the different examples described hereinabove, the mechanical element mounted such that it can move and/or be deformed extends inside a housing placed in a vacuum. However, the invention is not limited to devices with this feature, and also relates to alternatives wherein the mechanical element mounted such that it can move and/or be deformed does not extend inside a housing placed in a vacuum. The mechanical element mounted such that it can move and/or be deformed is thus surrounded by a gaseous medium to be analysed, which can fill both the measurement optical cavity and the excitation optical cavity.

The paragraphs below describe example methods for producing a measuring device according to the invention.

FIG. 11A to 11D show a method for producing a measuring device 1100 wherein the oscillating mechanical element 1150 forms a bottom mirror both for the excitation optical cavity and for the measurement optical cavity. In this embodiment:

the following are successively deposited on a first silicon substrate 11A: a first Bragg mirror 1121, and a layer 1125 that is transparent at the wavelength of the excitation light beam. The first silicon substrate 11A is then locally etched to form the side walls of the excitation optical cavity 1120 (FIG. 11A);

the following are successively deposited on a second silicon substrate 11B: a thermal oxide acting as an etch stop layer 1155, a silicon nitride ($Si_3N_4$) layer 1156, and a stack of layers forming a Bragg mirror 1157, then the rear face of the stack is etched as far as the etch stop layer 1155 so as to form the side walls of the measurement optical cavity 1140 (FIG. 11B);

a third Bragg mirror 1141 is produced on a glass substrate 11C that is transparent in the visible region (FIG. 11C); and the three stacks thus produced are bonded onto one another. The etch stop layer 1155, the silicon nitride layer 1156, and the Bragg mirror 1157 jointly form the oscillating mechanical element according to the invention.

The etching step of the rear face implements, for example, deep reactive-ion etching or wet etching with TMAH. Simultaneously with the etching step of the rear face, etching is carried out to pierce openings in the excitation optical cavity in order to allow passage of a gaseous or liquid medium to be studied.

The bonding steps differ depending on whether they involve two silicon substrates (in which case direct bonding is well suited), or a glass substrate and a silicon substrate (in which case vacuum bonding, eutectic bonding, or even metal bonding is well suited).

The Bragg mirrors are formed, for example, by alternating layers of silicon nitride (SiN) and silicon oxide ($SiO_2$).

FIG. 12A to 12C show a method for producing a measuring device 1200 wherein the excitation optical cavity and the measurement optical cavity are superimposed on one another. In this embodiment:

the following are deposited on a substrate of the silicon on insulator type 12A: a thin layer of silicon 1251 etched at the periphery and which will form the oscillating mechanical element 1250, a sacrificial oxide layer 1252, and a stack of layers forming a Bragg mirror 1221, then the rear face of the stack is etched to form the side walls of the optical cavities, and the sacrificial oxide layer 1252 is etched to free the oscillating mechanical element 1250 (FIG. 12A);

a second Bragg mirror 1241 is produced on a glass substrate 12B that is transparent in the visible region (FIG. 12B); and the two stacks thus produced are bonded one on top of the other.

The etching of the rear face of the stack implements different etching techniques to etch the different layers of the stack, in particular lithography, oxide etching, deep reactive-ion etching and chemical etching. Etching of the sacrificial layer involves vapour hydrofluoric acid etching.

Where appropriate, a third mirror can be added when the two optical cavities are not merged with one another, but instead superimposed on one another.

Again, the Bragg mirrors are preferably formed by alternating layers of silicon nitride (SiN) and silicon oxide ($SiO_2$).

The invention claimed is:

1. A device for measuring a physical variable comprising:
a first light source, configured to emit an excitation light beam with at least one emission peak centred at an excitation wavelength ($\lambda_E$); and
an excitation optical cavity, optically resonant at said excitation wavelength, and configured to receive, at the input, said excitation light beam;
wherein the measuring device further comprises:
a second light source, configured to emit a measurement light beam with an emission peak centred at a measurement wavelength ($\lambda_D$); and
a movable and/or deformable mechanical element mounted to move about an elastic recovery position and/or to be elastically deformable, located both on the optical path of the excitation light beam in the excitation optical cavity and on the optical path of the measurement light beam, and configured to be displaced and/or deformed by the excitation light beam;
wherein one of either the excitation light beam or the measurement light beam is configured to cause the movable and/or deformable mechanical element to oscillate, the device being configured such that the oscillation of said mechanical element depends on the physical variable to be measured, the measuring device further comprising detection means for detecting a variation in at least one property of the measurement light beam induced by the oscillation of said mechanical element, and computing means for deducing a measurement of the physical variable from the variation in said at least one property thus detected.

2. The device for measuring a physical variable according to claim 1, wherein the measurement wavelength ($\lambda_D$) is located in the visible and near-infrared spectrum, between 380 nm and 1 µm, and wherein the excitation wavelength ($\lambda_E$) is located outside of the visible and near-infrared spectrum.

3. The device for measuring a physical variable according to claim 1, wherein the excitation light beam is configured to cause the movable and/or deformable mechanical element to oscillate, and wherein the measurement light beam has a light intensity that is at most half that of the excitation light beam.

4. The device for measuring a physical variable according to claim 1, characterised wherein the excitation wavelength ($\lambda_E$) corresponds to the maximum of a resonance peak of the excitation optical cavity in equilibrium, the excitation optical cavity being considered to be in equilibrium when the movable and/or deformable mechanical element is located in a central position between two end positions of the oscillating movement thereof.

5. The device for measuring a physical variable according to claim 1, characterised further comprises a measurement optical cavity, optically resonant at said measurement wavelength ($\lambda_D$) and configured to receive, at the input, the measurement light beam, and wherein the movable and/or deformable mechanical element belongs both to the excitation optical cavity and to the measurement optical cavity.

6. The device for measuring a physical variable according to claim 5, wherein the measurement wavelength ($\lambda_D$) is situated on a resonance peak of the measurement optical cavity in equilibrium, the measurement optical cavity being considered to be in equilibrium when the movable and/or deformable mechanical element is located in a central position between two end positions of the oscillating movement thereof.

7. The device for measuring a physical variable according to claim 6, wherein the measurement wavelength ($\lambda_D$) is located on a slope of said resonance peak.

8. The device for measuring a physical variable according to claim 5, wherein a first face of the movable and/or deformable mechanical element is optically reflective at the excitation wavelength ($\lambda_E$), and wherein a second face of the movable and/or deformable mechanical element, opposite said first face, is optically reflective at the measurement wavelength ($\lambda_D$), with the excitation optical cavity extending on the same side as the first face of the movable and/or deformable mechanical element and the measurement optical cavity extending on the second face of the movable and/or deformable mechanical element.

9. The device for measuring a physical variable according to claim 5, wherein the excitation optical cavity and the measurement optical cavity at least partially cover one another, and wherein the movable and/or deformable mechanical element extends in a region located both within the excitation optical cavity and within the measurement optical cavity.

10. The device for measuring a physical variable according to claim 1, wherein the movable and/or deformable mechanical element extends along a surface area that lies in the range 100*100 µm$^2$ to 10*10 mm$^2$.

11. The device for measuring a physical variable according to claim 1, wherein at least one region within the excitation optical cavity is configured to receive a gaseous or liquid medium, and wherein the excitation wavelength ($\lambda_E$) corresponds to an absorption wavelength characteristic of a predetermined gas or liquid, such that during operation, the presence of said predetermined gas or liquid in the excitation optical cavity modifies the oscillation of the movable and/or deformable mechanical element.

12. The device for measuring a physical variable according to claim 11, wherein the movable and/or deformable mechanical element extends inside a vacuum housing.

13. The device for measuring a physical variable according to claim 1, wherein the movable and/or deformable mechanical element comprises a receiving area for receiving one or more particles, and wherein the movable and/or deformable mechanical element is configured such that, during operation, the oscillation thereof is modified by the presence of said particles on the receiving area.

14. The device for measuring a physical variable according to claim 1, wherein the detection means comprise an interferometer including arms, and one of the arms of the interferometer includes the measurement optical cavity.

15. The device for measuring a physical variable according to claim 1, wherein the device is configured such that the oscillation frequency of said mechanical element depends on the physical variable to be measured and such that said at least one property of the measurement light beam is a variation in the optical phase thereof and/or the modulation amplitude thereof.

* * * * *